US010055949B2

(12) United States Patent
Maalouf et al.

(10) Patent No.: US 10,055,949 B2
(45) Date of Patent: Aug. 21, 2018

(54) ADJUSTABLE HAPTIC WEARABLES

(71) Applicant: IMMERSION CORPORATION, San Jose, CA (US)

(72) Inventors: Johnny Maalouf, Laval (CA); Vahid Khoshkava, Montreal (CA)

(73) Assignee: IMMERSION CORPORATION, San Jose, CA (US)

( * ) Notice: Subject to any disclaimer, the term of this patent is extended or adjusted under 35 U.S.C. 154(b) by 0 days.

(21) Appl. No.: 15/398,856

(22) Filed: Jan. 5, 2017

(65) Prior Publication Data

US 2018/0190087 A1     Jul. 5, 2018

(51) Int. Cl.
| G08B 6/00 | (2006.01) |
| G06F 3/01 | (2006.01) |
| A63F 13/285 | (2014.01) |
| G06F 3/041 | (2006.01) |

(52) U.S. Cl.
CPC .............. *G08B 6/00* (2013.01); *G06F 3/014* (2013.01); *A63F 13/285* (2014.09); *G06F 3/016* (2013.01); *G06F 3/0414* (2013.01)

(58) Field of Classification Search
None
See application file for complete search history.

(56) References Cited

U.S. PATENT DOCUMENTS

| 8,362,882 B2 * | 1/2013 | Heubel ............... G06F 1/163 340/407.1 |
| 8,665,241 B2 | 3/2014 | Heubel et al. |
| 9,058,728 B2 | 6/2015 | Fantauzza |
| 2011/0301490 A1 * | 12/2011 | Mucke ............... A61B 5/04085 600/547 |
| 2012/0182135 A1 * | 7/2012 | Kusuura ............... G06F 3/00 340/407.1 |
| 2016/0296838 A1 * | 10/2016 | Goetgeluk ............ A63F 13/285 |
| 2016/0363997 A1 * | 12/2016 | Black ..................... G06F 3/014 |
| 2017/0192510 A1 * | 7/2017 | Ullrich ................... G06F 3/016 |

OTHER PUBLICATIONS

Bellan and Bossis, "Field Dependence of Viscoelastic Properties of MR Elastomers," Int. J. Mod. Phys. B. 16:2447-2453 (2002).
Palleau, et al., "Reversible patterning and actuation of hydrogels by electrically assisted ionoprinting," Nature Communications 4:2257 (2013).
Behl and Lendlein, "Shape Memory Polymers," MaterialsToday, vol. 10, pp. 20-28 (2007).

* cited by examiner

*Primary Examiner* — Leon-Viet Nguyen
(74) *Attorney, Agent, or Firm* — Medler Ferro Woodhouse & Mills PLLC (57) ABSTRACT

This disclosure relates to wearable articles, including wearable suits, etc., for providing haptic feedback to a user. The wearable articles suitably include adjustable interaction elements that can be fluidly connected to a liquid or gas supply, and can also include a haptic actuator. The wearable articles are useful in combination with various devices, including gaming systems and virtual or augmented reality systems.

19 Claims, 5 Drawing Sheets

ADJUSTABLE HAPTIC WEARABLES

TECHNICAL FIELD

This disclosure relates to wearable articles, including wearable suits, etc., for providing haptic feedback to a user. The wearable articles suitably include adjustable interaction elements that can be fluidly connected to a liquid or gas supply, and can also include a haptic actuator. The wearable articles are useful in combination with various devices, including gaming systems and virtual or augmented reality systems.

BACKGROUND

Haptic feedback for use in wearables has traditionally been based on the use of eccentric rotating mass (ERM) motors and linear resonant actuators (LRA). However, these types of actuators are typically bulky and often require large amounts of power, making them difficult to integrate into clothing or other wearables or accessories (i.e., jewelry, etc.). Shape memory alloys have also been used in wearables, but again, power consumption often limits their applicability and ease of integration. In addition, a "one-size fits all" approach to wearables for use in gaming and augmented or virtual reality is often not optimal, particularly as users desire a more life-like interaction and a more contoured or personalized fit.

What is needed are wearables that can be tailored to a specific user so as to provide both a custom fit as well as a mechanism for providing direct, haptic feedback.

SUMMARY

This disclosure relates to wearables for providing haptic feedback to a user. The wearable articles include an adjustable interaction element that can be adjusted to provide a custom fit to a user, as well as haptic actuators that can provide haptic feedback to the user.

In exemplary embodiments, provided herein is a wearable article for providing haptic feedback, which includes a structural material, an adjustable interaction element associated with the structural material, and a haptic actuator associated with the adjustable interaction element.

Also provided herein is a wearable article for providing haptic feedback, comprising a textile, an adjustable interaction element composed of a deformable material that can encapsulate a liquid or a gas associated with the textile, and fluidly connected to a liquid or gas supply, wherein the adjustable interaction element expands or contracts to provide a comfortable user fit and/or to provide haptic feedback to a user, and a haptic actuator associated with the adjustable interaction element.

BRIEF DESCRIPTION OF THE DRAWINGS

The foregoing and other features and aspects of the present technology can be better understood from the following description of embodiments and as illustrated in the accompanying drawings. The accompanying drawings, which are incorporated herein and form a part of the specification, further serve to illustrate the principles of the present technology. The components in the drawings are not necessarily to scale.

DETAILED DESCRIPTION

Various embodiments will be described in detail, some with reference to the drawings. Reference to various embodiments does not limit the scope of the claims attached hereto. Additionally, any embodiments set forth in this specification are not intended to be limiting and merely set forth some of the many possible embodiments for the appended claims.

Whenever appropriate, terms used in the singular also will include the plural and vice versa. The use of "a" herein means "one or more" unless stated otherwise or where the use of "one or more" is clearly inappropriate. The use of "or" means "and/or" unless stated otherwise. The use of "comprise," "comprises," "comprising," "include," "includes," "including," "has," and "having" are interchangeable and not intended to be limiting. The term "such as" also is not intended to be limiting. For example, the term "including" shall mean "including, but not limited to."

Figure 1A:
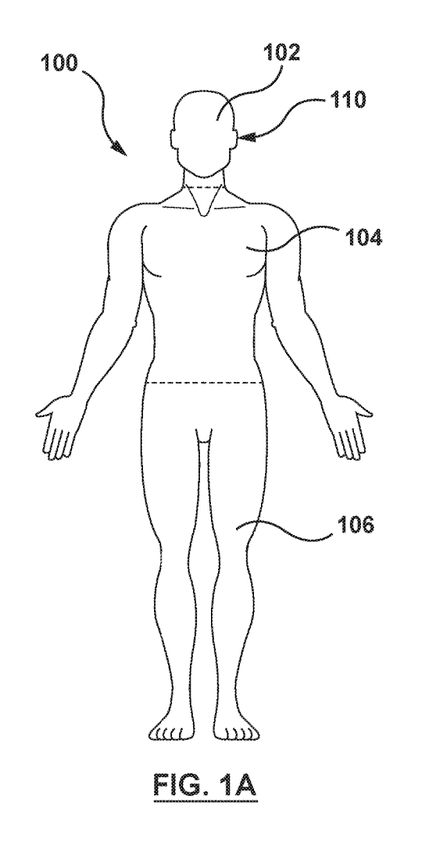
FIG. 1A shows a wearable article for providing haptic feedback to a user in accordance with an embodiment hereof.

In embodiments, provided herein is a wearable article for providing haptic feedback. As used herein "wearable article" refers to an article that can be worn by a user, and includes for example, various articles of clothing such as, a shirt, a blouse, pants, shoes, hats, gloves, a suit, including a full body suit that covers some or all of a user from head to toe, etc. For example, as shown in FIG. 1A, a wearable article 100 can include portions that cover a head 102, a trunk 104 and legs 106 of a user 110. The dotted lines in FIG. 1A are shown to simply denote different sections of a user's body. The wearable articles can also include commonly used zippers, snaps, buckles, buttons, Velcro, other attachments, etc., to secure the wearable article to the user.

As used herein "haptic feedback" or "haptic feedback signal" refer to information such as vibration, texture, and/or heat, etc., that are transferred, via the sense of touch, from the wearable articles as described herein, to a user.

Figure 1B:
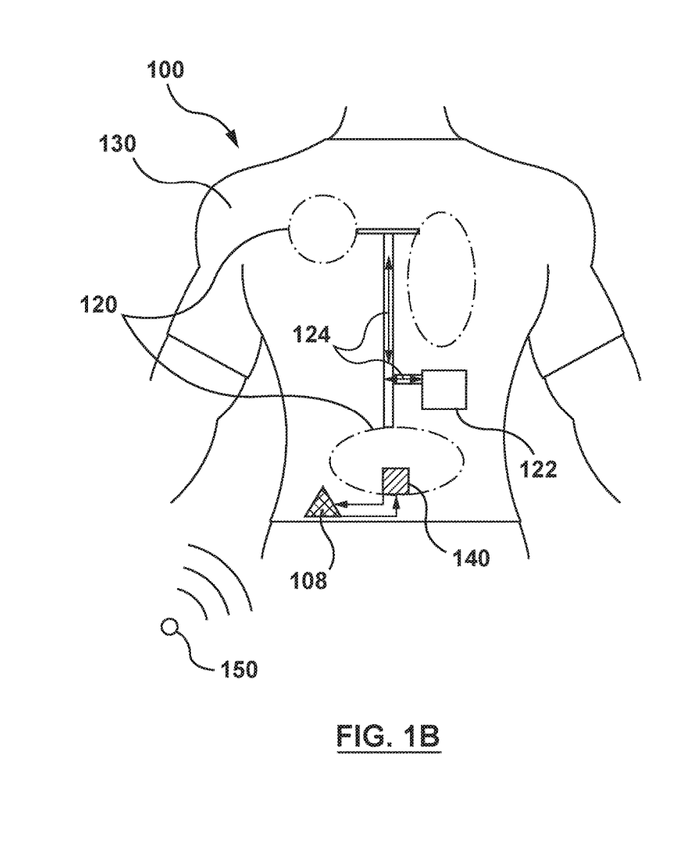
FIG. 1B shows a detailed view of a wearable article for providing haptic feedback in accordance with an embodiment hereof.

FIG. 1B shows wearable article 100 in the form of a shirt. As shown, in embodiments, wearable article 100 includes a structural material 130, an adjustable interaction element 120 associated with structural material 130, and a haptic actuator 140 associated with the adjustable interaction element. Only one haptic actuator 140 associated with one adjustable interaction element 120 is shown, but as described herein, each adjustable interaction element 120 can include an associated haptic actuator 140, or multiple haptic actuators.

As used herein, "structural material" means a material used in constructing a wearable, personal accessory, luggage, etc. Examples of structural materials include: fabrics and textiles, such as cotton, silk, wool, nylon, rayon, synthetics, flannel, linen, polyester, woven or blends of such fabrics, etc.; leather; suede; pliable metallic such as foil; Kevlar, etc. Examples of wearables include: clothing; footwear; prosthetics such as artificial limbs; headwear such as hats and helmets; athletic equipment worn on the body;

protective equipment such as ballistic vests, helmets, and other body armor. Personal accessories include: eyeglasses; neckties and scarfs; belts and suspenders; jewelry such as bracelets, necklaces, and watches (including watch bands and straps); and wallets, billfolds, luggage tags, etc. Luggage includes: handbags, purses, travel bags, suitcases, backpacks, and including handles for such articles, etc.

As used herein an "adjustable interaction element" refers to a structure whose shape can be modified or deformed so as to expand or contract, thereby adjusting against the body of a user. As described herein, in embodiments, the adjustable interaction elements include a deformable material that can encapsulate a liquid or a gas. That is, the deformable material can create a pocket, packet or other reservoir that can hold and maintain a liquid or a gas, while allowing expansion and contraction of the adjustable interaction element. Examples of deformable materials include various polymers or rubbers, including for example, silicones, fluoropolymers, natural rubbers and acrylic and urethane-based elastomers. The mechanical properties of polymers and rubbers can also be tuned via various curing techniques to create the deformable material having the desired flexibility and deformation characteristics.

Deformable material 120 will suitably have a thickness on the order of about 1 µm to millimeters, e.g., about 1 µm to 5 mm, about 1 µm to 1 mm, about 1 µm to 500 µm, or about 5 µm to about 500 µm, or about 10 µm to 500 µm, or about 1 µm to about 100 µm, though thicker or thinner materials can also be utilized.

As shown in FIG. 1B, adjustable interaction element 120 is fluidly connected to a liquid or a gas supply 122, via for example, a tubing 124 or other conduit or channel that can carry a liquid or gas from supply 122 to the adjustable interaction elements. Thus, adjustable interaction elements 120 act as sacks or bags capable of inflation/deflation within the wearable article. In embodiments, the adjustable interaction elements can be sewn or otherwise attached to structural material 130, or can be enclosed within a pocket or internal structure of structural material 130, or otherwise associated or integrated into structural material 130 such that a wearable article is created that can be put on and removed easily by user 110.

Figure 2A:
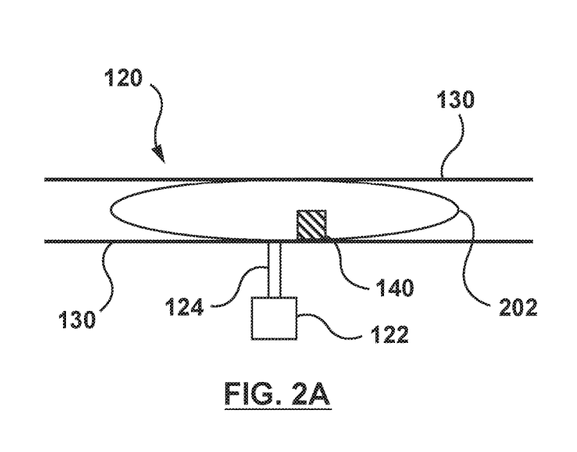
FIGS. 2A-2C show adjustable interaction elements in accordance with embodiments hereof.
Figure 2B:
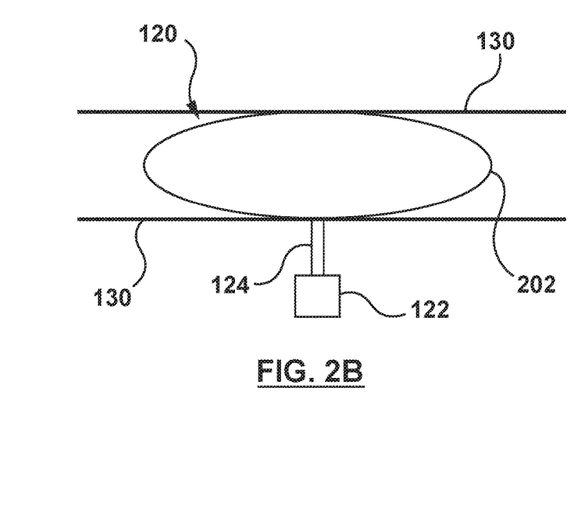
Figure 2C:
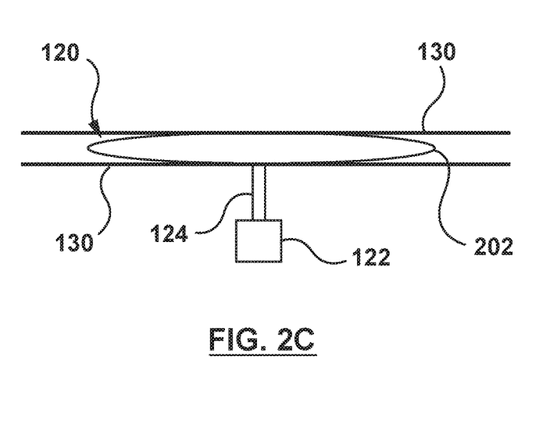

Once user 110 puts on wearable article 100, adjustable interaction element 120 can be expanded or contracted to provide a comfortable fit against the body of the user. This can occur over the user's clothing or directly against the skin of the user. FIG. 2A illustrates adjustable interaction element 120, which includes a deformable material 202, associated with structural material 130. As shown, structural material 130 is represented as two sides of a textile, for example, but can be a continuous piece of material, or other structure. Upon introduction of a liquid or a gas from supply 122, through tubing 124 which provides a fluid connection, adjustable interaction element 120 expands, thereby increasing in volume, as in FIG. 2B. This expansion can be used to create a comfortable fit against the body of a user, securing the wearable article against the user that allows the article to move with a user, without sliding or moving out of position, or otherwise not making contact with a user's body. As shown in FIG. 2C, liquid or gas can be removed from adjustable interaction element 120, via tubing 124 into supply 122, which then deflates or reduces the volume of the adjustable interaction element. This removal of liquid or gas can allow for easy removal of a wearable article by a user, or can be employed when additional space is required or desired in the wearable article, such as when being used by a user that is larger than the prior user, or a different body shape, or if the user requires different levels of expansion or contraction of adjustable interaction element to provide a comfortable user fit. Thus, as used herein, the term "comfortable user fit" or "comfortable fit" would be understood by a person of ordinary skill in the art to mean a fit that is at least tight enough to allow for a haptic effect to be provided via the wearable article, as described herein.

Examples of liquids and gases that can be used to expand and contract adjustable interaction element 120 include, but are not limited to, air, water, fluorocarbon gas, nitrogen, inert gases such as neon, helium, argon, liquid coolants, etc. Thus, supply 122 can be a closed source of fluid or gas, such as a liquid reservoir holding water or other liquid, or a gas reservoir, or the gas can simply be drawn from ambient air around the user.

In additional embodiments, the expansion or contraction of the adjustable interaction element, in response to introduction or removal of fluid, can provide haptic feedback to the user. For example, inflating the adjustable interaction element can produce pressure against the body of a user, and if done rapidly, can produce a specific, focused sensation of pressure. Similarly, a repeated rapid inflation and deflation can result in a vibrational haptic feedback. Vibration can be on the order of a few Hz to 10 s of Hz to 100 s of Hz from the rapid, repeated inflation and deflation of the adjustable interaction element.

In addition to tubing 124 and supply 122, adjustable interaction element 120 can be expanded or contracted through the use of a pneumatic or hydraulic actuation system to move liquid or gas into and out of the adjustable interaction element. In additional embodiments, an ultrathin blower or fan, including for example a dual piezoelectric jet, can be used to inflate and deflate the adjustable interaction element by moving a gas, such as air, into and out of the adjustable interaction element.

As shown in FIG. 1B and FIG. 2A, adjustable interaction element 120 also suitably includes a haptic actuator 140, associated with adjustable interaction element. Haptic actuator 140 in FIGS. 1B and 2A is shown for illustrative purposes only and does not imply location or size of the haptic actuator, but simply to indicate that the adjustable interaction element can include the haptic actuator. "Association" of haptic actuator 140 with adjustable interaction element 120 indicates that the haptic actuator is physically or mechanically connected to the adjustable interaction element, or can include that the haptic actuator is enclosed within or encapsulated by the adjustable interaction element. Association of haptic actuator with adjustable interaction element 120 includes use of various glues or adhesives, mechanical couplings, such as staples, screws, etc., as well as integrated structures such as polymeric castings, coatings, etc.

Figure 3A:
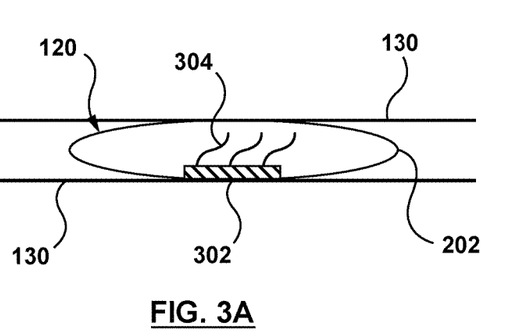
FIGS. 3A-3F show alternative adjustable interaction elements including haptic actuators in accordance with embodiments hereof.

Examples of haptic actuators include eccentric rotating mass (ERM) motors and linear resonant actuators (LRA). In additional embodiments, for example as illustrated in FIG. 3A, a heating mechanism 302 can be associated with adjustable interaction element 120 to act as the haptic actuator. In such embodiments, heat 304 from heating mechanism 302 can cause a gas in adjustable interaction element 120 to expand, generating haptic feedback to the user. In addition, heat 304 from heating mechanism 302 can warm the body of a user to generate haptic feedback in the form of a change in temperature. Similarly, a cooling mechanism can also be used to create a cooling effect for a user.

Figure 3B:
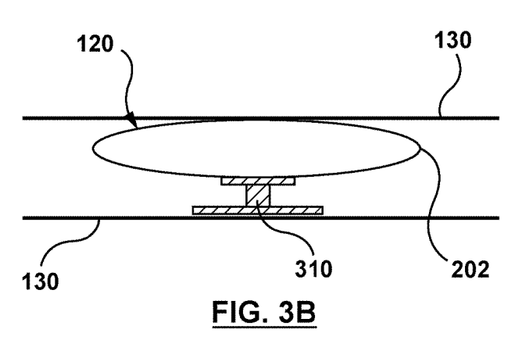

FIG. 3B shows an embodiment where a pneumatic or hydraulic actuation system 310 is used as the haptic actuator. In such embodiments, the pneumatic or hydraulic actuation system can move relative to a user's body to create increases and/or decreases in pressure as adjustable interaction element 120 is moved away or toward the user, including compressing against the body of the user or contacting the user to provide pressure.

Figure 3C:
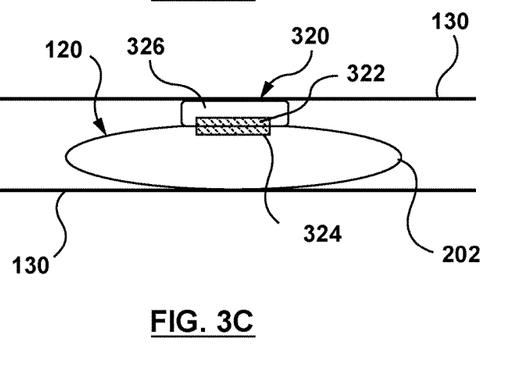

FIG. 3C shows a further embodiment, in which deformable material 202 can be made of an electroactive material, including for example, a dielectric polymer or dielectric elastomer. As used herein, an "electroactive material" refers to a material that exhibits a change in shape or size when stimulated by an electric field (either direct or alternating current). Exemplary electroactive materials, as described herein, include electroactive polymers and piezoelectric materials. In embodiments, deformable material 202 includes an electroactive polymer, which includes polymers such as, but not limited to, poly(vinylidene fluoride), poly(pyrrole), poly(thiophene), poly(aniline) and mixtures, co-polymers, and derivatives thereof. Exemplary classes of electroactive polymers include dielectric and ionic polymers. A dielectric polymer may be made to change shape in response to an electrostatic force being generated between two electrodes that then squeezes the polymer. Dielectric polymers are capable of very high strains and are fundamentally a capacitor that changes its capacitance when a voltage is applied by allowing the polymer to compress in thickness and expand in area due to the electric field. An ionic polymer may undergo a change in shape or size due to displacement of ions inside the polymer. In addition, some ionic polymers require the presence of an aqueous environment to maintain an ionic flow.

Methods of preparing electroactive polymers are known in the art, and can suitably include dissolving a desired polymer in a suitable solvent, and then casting the polymer in the desired shape (i.e., pouch, pocket, bubble, etc.). Alternatively, the polymer may be drawn, or subjected to fiber spinning techniques, so as to be prepared as a filament or fiber. Additional methods include melt mixing, in which the polymer is heated above the softening/melting point, and then the polymer film is processed using film processing (casting or blowing) techniques. The electroactive polymers, if prepared as relatively flat structures, can also be prepared by layering various polymer sections or layers to create the final desired structure. Electroactive polymers known as dielectric elastomer can be fabricated using a material such as a very high bond (VHB) acrylic foam tape, or a silicone material, and then bi-stretching the material (depends on the type of the base material), followed by the application of an electrode to provide the electroactive properties to the material As shown in FIG. 3C, deformable material 202 is suitably placed between two electrodes, 322 and 324. In addition, a further layer or encapsulating film made of an insulator 326 can be placed around external electrode 322. The resulting smart material actuator 320 can deform in response to an applied electric field between the two electrodes, resulting in motion or deformation of deformable material 202, providing haptic feedback to a user. In addition, rapidly changing the electric field can result in a vibrational haptic feedback to a user. Electrodes 322 and 324 can be patterned on the surface of the deformable material, or can be added as coatings, layers, sputtered films, etc. Examples of materials for use as electrodes herein include, for example, silver, gold, or other conductive metals or polymer (e.g., thin films of Au, Al, Ag, Cr, poly(3,4-ethylenedioxythiophene) polystyrene sulfonate (PEDOT:PSS), etc.), organic electrodes such as carbon nanotubes, carbon black and graphene. Further, an electrode can be prepared from the base material.

For example, carbon black can be mixed with silicon and then a thin layer of this conductive material can be coated on both sides of a silicon membrane and then be cured. Suitably, electrodes 322 and 324 will have a thickness on the order of about 50 nm to millimeters, e.g., about 50 nm to 5 mm, about 50 nm to 1 mm, about 50 nm to 500 μm, about 100 nm to about 500 μm, about 1 μm to 500 μm, or about 5 μm to about 500 μm, or about 10 μm to 500 μm, or about 1 μm to about 100 μm, though thicker or thinner materials can also be utilized, depending on the desired use and orientation of the electrodes.

Figure 3D:
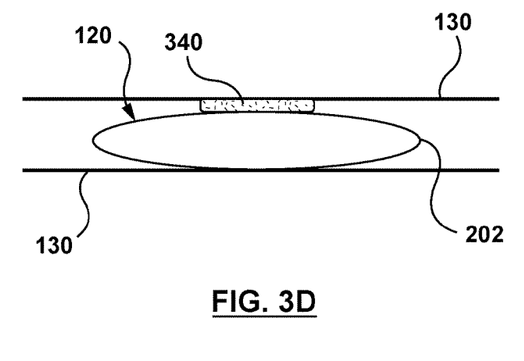

In additional embodiments, as shown in FIG. 3D, a polymeric actuator 340 can be associated with adjustable interaction element 120. Polymeric actuator 340 can be an electroactive polymer or a piezoelectric polymer. Examples of electroactive polymers as described herein, include for example polymers such as, but not limited to, poly(vinylidene fluoride), poly(pyrrole), poly(thiophene), poly(aniline) and mixtures, co-polymers, and derivatives thereof, as well as dielectric elastomers such as those based on silicons or acrylics. In addition to piezoelectric polymers, such as polyvinylidene difluoride fibers, other piezoelectric materials such as barium titanate, hydroxyapatite, apatite, lithium sulfate monohydrate, sodium potassium niobate, quartz, lead zirconium titanate (PZT), tartaric acid, etc., can also be used. In embodiments in which a piezoelectric material is used, vibrations can be transferred to the user via the adjustable interaction element, in response to an electric field applied to the piezoelectric material.

Figure 3E:
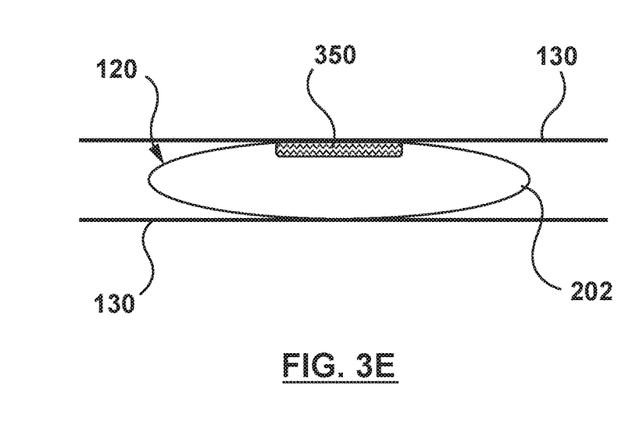

In still further embodiments, the inside of deformable material 202 can be coated with a conductive material, including a conductive film or coating, to create an electrostatic actuator 350, as shown in FIG. 3E. In such embodiments, the adjustable interaction element will act as the mechanism for providing haptic feedback, suitably vibrating in response to the electrostatic force that results from contact or close approach of the electrostatic actuator to the user, providing an electrostatic feedback. Electrostatic feedback can be in the form of a short vibration or pulse, or an extended vibration to the user. The frequency of the electrostatic feedback or interaction can be on the order of about 1 Hz to about 1000 Hz, more suitably about 1 Hz to about 500 Hz, about 1 Hz to about 200 Hz, about 10 Hz to about 200 Hz, about 10 Hz to about 100 Hz, or about 10 Hz, about 20 Hz, about 30 Hz, about 40 Hz, about 50 Hz, about 60 Hz, about 70 Hz, about 80 Hz, about 90 Hz or about 100 Hz. Haptic feedback can also be provided by the electrostatic interaction if a user simply approaches, or is near, the adjustable interaction element, signaling a close proximity to the adjustable interaction element or the electrostatic actuator, which may result in the electrostatic interaction and the haptic feedback therefrom.

Figure 3F:
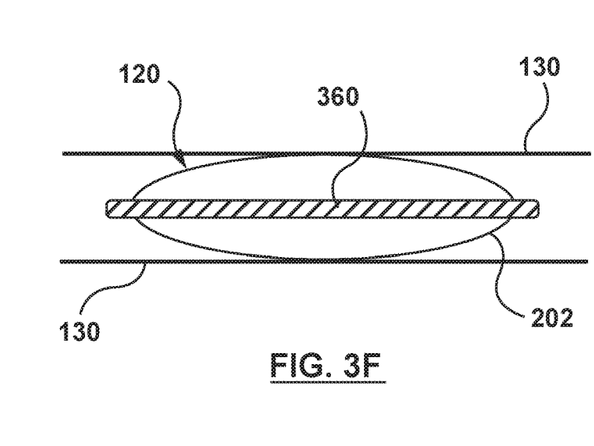

In still further embodiments, as shown in FIG. 3F, the haptic actuator for use with adjustable interaction element 120 can be a motorized mechanism 360, including for example, a belt, or a spring, which can be configured around the adjustable interaction element, and act to constrict and then relax the adjustable interaction element, causing it to contact a user to provide haptic feedback, and then withdraw the contact. Additional examples of motorized mechanism 360, include but are not limited to, a vibrating mechanism, an eccentric rotating mass (ERM) motor, a linear resonant actuator (LRA), a C-2 tactor, a transducer, a piezoelectric actuator or motor, etc., and in such embodiments, motorized mechanism 360 can be placed inside of adjustable interaction element 120. As described herein, in embodiments the motorized mechanism can be configured so as to create a vibrational haptic feedback, that vibrates with a frequency on the order of a few Hz to 10s of Hz to 100s of Hz, e.g., up to 300-500 Hz, if desired. Motorized mechanism 360 can be placed either internally inside of adjustable interaction element 230, or placed externally, on the outside of the adjustable interaction element, to provide the haptic feedback. In embodiments where motorized mechanism 360 is placed inside of adjustable interaction element 120, the motorized mechanism can create movement or vibration that transfers through the outer surface of the adjustable interaction element, so that it is perceived by the user.

Figure 4A:
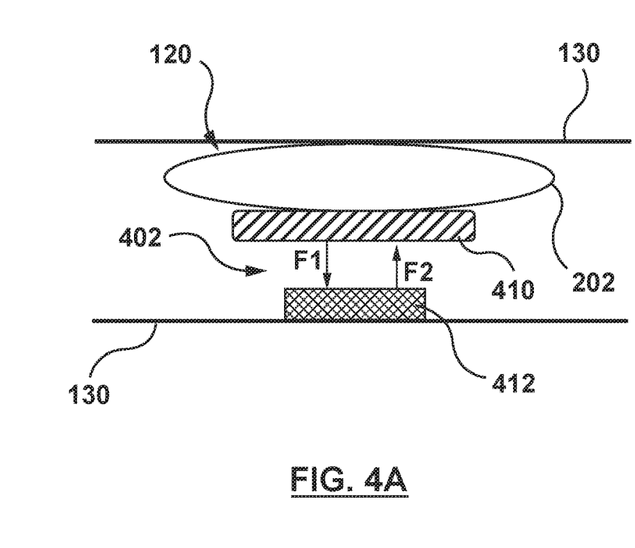
FIGS. 4A-4B show additional adjustable interaction elements including a haptic actuator in accordance with embodiments hereof.
Figure 4B:
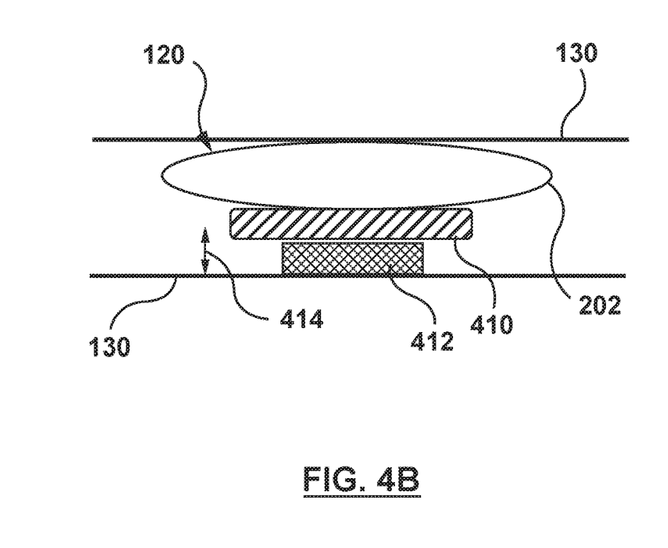

In an additional embodiments, FIGS. 4A-4B show an embodiment where an electromagnetic system is employed as the haptic actuator for association with the adjustable interaction element. In embodiments, as shown in FIG. 4A, a coil 410, suitably a magnetic coil, is associated with or attached to deformable material 202. A magnet 412, is attached opposite the coil, so as to be substantially diametrically opposed to each other. As used herein, magnetic field of coil 410 and magnetic field of magnet 412, refer to the direction of the magnetic field lines from an electromagnetic coil (e.g., coil 410) and from a magnet (e.g., magnet 412). Magnetic field F1 and magnetic field F2 are substantially diametrically opposed to each other, meaning that they oppose each other in such a way that an angle between the direction of the respective magnetic field lines is less than about 10 degrees. Producing a magnetic field with coil 410 will repel and attract magnet 412, depending on the direction/polarity of the magnetic fields, resulting in an oscillation 414, which can occur at various frequencies from Hz, to 10s of Hz, to 100s of Hz, e.g., up to 300-500 Hz, if desired.

Coil 410 is suitably an electromagnetic coil, for example, a coil of a conductive fiber, such as a wire, including for example a copper coil. Coil 410 can also be an air coil, which refers to a winding of conductive material around a non-magnetic center, including an air center. Electromagnetic coils are known in the art to refer to electrical conductors made in the shape of a coil, spiral or helix, which generate a magnetic field as the result of a current passing through the coil. Coil 410 can comprise any suitable conductive material, and in embodiments, comprises a wire of a conductive material. Examples of conductive materials include metals (such as aluminum, copper, gold and chromium), transparent conducting oxides ("TCO," such as tin-doped indium oxide ("ITO") and aluminum-doped zinc oxide ("AZO")), transparent carbon nanotubes (CNTs), transparent conducting polymers (such as Poly(3,4-ethylenedioxythiophene) ("PEDOT"), Poly(3,4-ethylenedioxythiophene):poly(styrene sulfonate) ("PEDOT:PSS") and Poly(4,4-dioctylcyclopentadithiophene)). Additionally, coil 410 can be formed with conductive nanoparticles or nanowires that can have any suitable nano-shapes or geometries (i.e., with size scales (diameters, lengths, widths) on the order of 1-500 nm). Other embodiments of the coil can have a scale other than a nano-scale. In embodiments, magnet 412 is suitably a permanent magnet having a set polarity. Though in other embodiments, a second coil connected to a power supply can be used to generate a magnetic field as described herein, to act as magnet 412. Exemplary materials for magnet 412 include iron, nickel, cobalt, alloys of rare earth metals, and naturally occurring minerals such as lodestone.

Additional types of haptic actuators include the use of phase change materials or shape memory materials or polymers, which can be separate from deformable material 202. In additional embodiments, deformable material 202 can be made from a phase change material, shape memory material or polymer. Phase change materials, including for example different waxes such as paraffin wax, can increase in volume (on the order of 10%-40%) when externally activated. Such as, for example, heating a phase change material can cause it to soften or melt, resulting in an increase in volume, thereby providing motion and haptic feedback to a user.

Additional embodiments can utilize a smart hydrogel, which can change volume and shape in response to changes in different external factors, as the haptic actuator. In further embodiments, the deformable material can include a smart hydrogel. As used herein, "hydrogel" refers to a network of cross-linked hydrophilic polymers capable of absorbing and releasing large amounts of water while maintaining their structural integrity. Hydrogels exhibit the ability to change shape in response to external stimuli such as salinity, buffer conditions or components, pH, temperature, light, as well as an electric field. Exemplary hydrogels include for example, polyelectrolytes such as sodium polyacrylate (pNaAc), such as is disclosed in Palleau et al., "Reversible patterning and actuation of hydrogels by electrically assisted ionoprinting," *Nature Communications* 4:2257 (2013), the disclosure of which is incorporated by reference herein in its entirety, including for the disclosure therein of hydrogels and methods of preparing such.

In additional embodiments, the haptic actuators for use herein can include a shape memory polymer. Shape memory polymers (SMP) allows for programming of a polymer providing it with the ability to change shape from a first to a second shape. The shape-memory effect is not an intrinsic property, meaning that polymers do not display this effect by themselves. Shape memory results from a combination of polymer morphology and specific processing and can be understood as a polymer functionalization. By conventional processing, e.g. extruding or injection molding, the polymer is formed into its initial, permanent shape B. Afterwards, in a process called programming, the polymer sample is deformed and fixed into the temporary shape A. Upon application of an external stimulus (e.g., heat, electric field or pressure), the polymer recovers its initial permanent shape B. This cycle of programming and recovery can be repeated several times, with different temporary shapes in subsequent cycles. Shape-memory polymers can be elastic polymer networks that are equipped with suitable stimuli-sensitive switches. The polymer network consists of molecular switches and net points. The net points determine the permanent shape of the polymer network and can be a chemical (covalent bonds) or physical (intermolecular interactions) nature. Physical cross-linking is obtained in a polymer whose morphology consists of at least two segregated domains, as found for example in block copolymers. Additional information and examples of SMPs can be found in Shape Memory Polymers, *MaterialsToday*, Vol. 10, pages 20-28 (April 2007), the disclosure of which is incorporated by reference herein in its entirety.

Transformation of SMPs from one or a first configuration to another or a second configuration is suitably controlled by controlling the temperature of the SMP in relation to its glass transition temperature (Tg). Raising the temperature of the SMP by heating it above its Tg, will cause the SMP actuator to transition to its second (memorized or original) configuration, resulting in activation or actuation of the multi-stable material and moving or transforming from a first stable configuration to a second stable configuration, and suitably to a third (and fourth, fifth etc., if desired) stable configuration. Exemplary shape memory polymers include various block copolymers, such as various poly(urethanes), poly (isoprene) and poly(ether esters), which have been programmed to have the required shape memory characteristics.

In additional embodiments, the haptic actuators for use in combination with the adjustable interaction elements can include combinations of the various actuators described herein. For example, a piezoelectric actuator can be combined with a pneumatic or other mechanical actuator, resulting in actuation that provides both vibrational and deformational haptic feedback. Additional combinations include, mechanical actuators in combination with electromagnetic actuation, a thermal actuator can be combined with a piezoelectric actuator, an electromagnetic actuator can be combined with a smart material actuator, etc., to provide different combinations of haptic feedback.

As shown in FIG. 1B, suitably wearable article 100 includes a plurality of adjustable interaction elements 120. As used herein, a "plurality" refers to more than 2 of an element or object, and in embodiments herein suitably refers to 2, 3, 4, 5, 10, 15, 20, 30, 40, 50, 60, 70, 80, 90, 100, etc., of an element, including adjustable interaction elements 120. The use of a plurality of adjustable interaction elements 120 in wearable article 100 allows for placement of the adjustable interaction elements in different positions of the wearable article, such that they can provide a comfortable fit for the user (e.g., in the chest, stomach, legs, waist, etc.) and also provide haptic feedback to desired areas of the body for use in gaming, virtual reality, etc. In embodiments, each of the plurality of adjustable interaction elements 120 will also include actuators 140, as described herein. In further embodiments, only select adjustable interaction elements 120 will include actuators 140, thus allowing some adjustable interaction elements to function primarily to provide a comfortable fit to a user, with others providing fit and/or haptic feedback.

The shapes, sizes and locations of adjustable interaction elements 120 shown in FIG. 1B are illustrative only, and any suitable shape, size or location in wearable article can be used. For example, adjustable interaction elements 120 can be circular, square, rectangular, oval, football shapes, spherical, irregular in shape, etc. The size of adjustable interaction elements 120 can be on the order of millimeters to centimeters to 10s of centimeters, to 100s of centimeters in diameter, length, width, etc.

As described herein, as shown in FIG. 1B, in embodiments a power source 108 can be electrically coupled, i.e., connected to actuator 140, to provide the power required to activate the actuator, e.g., to provide heat, mechanical motion, electrostatic feedback, etc. Electrical coupling includes both wireless and hard-wired connections. The amount of power provided by power source 108 is generally on the order of about 0.1 Watts (W) to about 10 W, or more suitably about 0.5 W to about 5 W, or about 1 W to about 5 W, or about 0.5 W, about 1 W, about 2 W, about 3 W, about 4 W or about 5 W. Exemplary power sources 108 include various battery packs as well as solar energy sources. Power source 108 can also include a re-chargeable system, for example, a system capable of recharging through the use of a piezoelectric material, as described herein, providing a current to the system.

As shown in FIG. 1B, an activating signal 150, suitably from an external device or source, can be used to activate haptic actuator 140. The activating signal can also be used to expand or contract adjustable interaction element 120, though suitably control of the expansion and contraction to provide a comfortable user fit will be controlled directly by the user from a controller located on or near the wearable article.

Exemplary activating signals can be from a cellular phone, tablet, computer, car interface, smart device, game console, etc., and can indicate for example the receipt of a text message or email, phone call, appointment, etc. As described herein in greater detail, activating signal 150 suitably originates from a gaming or virtual reality system.

In further embodiments, a controller is also suitably included to provide an interface between an external device and the adjustable interaction elements and/or haptic actuators described herein. Components of a controller are well known in the art, and suitably include a bus, a processor, an input/output (I/O) controller and a memory, for example. A bus couples the various components of controller, including the I/O controller and memory, to the processor. The bus typically comprises a control bus, address bus, and data bus. However, the bus can be any bus or combination of busses suitable to transfer data between components in the controller.

A processor can comprise any circuit configured to process information and can include any suitable analog or digital circuit. The processor can also include a programmable circuit that executes instructions. Examples of programmable circuits include microprocessors, microcontrollers, application specific integrated circuits (ASICs), programmable gate arrays (PGAs), field programmable gate arrays (FPGAs), or any other processor or hardware suitable for executing instructions. In the various embodiments, the processor can comprise a single unit, or a combination of two or more units, with the units physically located in a single controller or in separate devices.

An I/O controller comprises circuitry that monitors the operation of the controller and peripheral or external devices. The I/O controller also manages data flow between the controller and peripherals or external devices. Examples of peripheral or external devices with the which I/O controller can interface include switches, sensors, external storage devices, monitors, input devices such as keyboards, mice or pushbuttons, external computing devices, mobile devices, and transmitters/receivers.

The memory can comprise volatile memory such as random access memory (RAM), read only memory (ROM), electrically erasable programmable read only memory (EEPROM), flash memory, magnetic memory, optical memory or any other suitable memory technology. Memory can also comprise a combination of volatile and nonvolatile memory.

The memory is configured to store a number of program modules for execution by the processor. The modules can, for example, include an event detection module, an effect determination module, and an effect control module. Each program module is a collection of data, routines, objects, calls and other instructions that perform one or more particular task. Although certain program modules are disclosed herein, the various instructions and tasks described for each module can, in various embodiments, be performed by a single program module, a different combination of modules, modules other than those disclosed herein, or modules executed by remote devices that are in communication with the controller.

In embodiments described herein, the controller, which can include a wireless transceiver (including a Bluetooth or infrared transceiver), can be integrated into structural material 130 or separate from the structural material. In further embodiments, the controller can be on a separate device from the structural material, but is suitably connected via a wired or more suitably a wireless signal, so as to provide activating signal 150 to the various components of the systems described herein.

For example, the controller can provide activating signal 150 to an actuator drive circuit, which in turn communicates with power supply 108, of the haptic actuators described herein, so as to provide haptic feedback to a user. For example, desired haptic feedback can occur, for example, when a mobile phone or other device to which a controller is paired via wireless connection receives a message or email. Additional examples include a controller being associated with devices such as game controllers, systems or consoles, computers, tablets, car or truck interfaces or computers, automated payment machines or kiosks, various keypad devices, televisions, various machinery, etc. In such embodiments, the controller suitably provides activating signal 150 to an actuator drive circuit, to provide haptic feedback to a user in response to a signal originated by or from an external device. The device can also be a part of the wearable on which the various components of the haptic feedback systems described herein are contained. Exemplary feedback or signals that can be provided by a device, include, for example, indications of incoming messages or communication from a third party, warning signals, gaming interaction, driver awareness signals, computer prompts, etc.

As described herein, the wearable articles can be implemented in various gaming systems and used with, or as part of, a virtual reality or augmented reality system. In such embodiments, the wearable article can provide haptic feedback to a user as he or she interacts with a virtual or augmented reality system, providing responses or feedback initiated by the virtual reality or augmented reality components and devices. For example, in a gaming or virtual reality system, a user can feel interaction from a character in a game or gaming scenario when he or she interacts with the character in physical manner, or with the game components/scenery in general (e.g., touching, hitting, kicking, tackling, falling, etc.), or when there is interaction with a component of the game (e.g., bullet, car accident, weapon, etc.). Other types of interactions where haptic feedback can be utilized can be readily envisioned by those of ordinary skill in the art.

Also provided herein are methods in which a user places the wearable article described herein on the user's body and adjusts the adjustable interaction element(s) by increasing or decreasing a fluid or gas flow (e.g., air flow) into the adjustable interaction element to expand or contract the adjustable interaction element. This adjustment allows for and provides a comfortable user fit that can be customized and personalized to the size, body shape, and other desires of the user. The wearable article is can then be interfaced or connected to a gaming system, virtual reality system or augmented reality system. Suitably, this connection occurs wirelessly to a gaming console or virtual reality system. Upon receipt of activating signal 150 from the gaming or virtual reality system, haptic actuator(s) 140 in the wearable article provide haptic feedback to the user. Such feedback is described herein, and can be mechanical in nature (deformation, movement, vibration) or electrostatic in nature. As described, the haptic feedback can signal an interaction with a component or scenario of the game or virtual reality system, a character of the game or system, or a choice or decision made by the user. Such interactions include physical hitting, kicking, punching, falling, etc., as well as interactions such as increases or decreases in temperature, and interactions with weapons, etc. Upon completion of the game or virtual reality simulation, the user can signal the adjustable interaction elements to contract (i.e., deflate), allowing for easier removal of the wearable article.

In further embodiments, provided herein are wearable articles for providing haptic feedback, including a textile, an adjustable interaction element composed of a deformable material that can encapsulate a liquid or a gas associated with the textile, and fluidly connected to a liquid or gas supply. As described herein, the adjustable interaction element expands or contracts to provide a comfortable user fit and/or provides haptic feedback to a user. The wearable articles further include a haptic actuator associated with the adjustable interaction element.

Exemplary textiles include various materials such as wool, cotton, synthetics, nylon, etc., and suitably the textiles take the form of an item of clothing such as shirt, a pair of pants, a bodysuit, a hat, a glove, a shoe, etc.

Exemplary components for use as the adjustable interaction element, including various polymers, are described herein. In addition, exemplary actuators are described throughout.

In embodiments, the wearable article includes a plurality of adjustable interaction elements, with each adjustable interaction element fluidly connected to a liquid or gas supply, such as an air supply.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A wearable article for providing haptic feedback, comprising:
   a structural material;
   an adjustable interaction element associated with the structural material and composed of a deformable material for encapsulating a liquid or gas;
   the adjustable interaction element fluidly connected to a liquid or gas supply and the deformable material placed between an inner and an outer electrode, the inner electrode located within the adjustable interaction element and positioned to physically contact the liquid or gas in the adjustable interaction element, and an insulator placed around the outer electrode to create a smart material actuator which can deform in response to an applied electric field between the two electrodes, wherein the adjustable interaction element expands or contracts to provide a comfortable user fit; and
   wherein the applied electric field between the two electrodes results in haptic feedback provided by the adjustable interaction element.

2. The wearable article of claim 1, wherein the structural material comprises a textile.

3. The wearable article of claim 2, wherein the textile is in the form of a shirt, a pair of pants, a bodysuit, a hat, a glove or a shoe.

4. The wearable article of claim 1, wherein the deformable material comprises an electroactive material.

5. The wearable article of claim 1, wherein the adjustable interaction element secures the wearable article against a user to allow the wearable article to move with the user, without sliding or moving out of position.

6. The wearable article of claim 1, wherein the adjustable interaction element is fluidly connected to an air supply.

7. The wearable article of claim 1, further comprising a haptic actuator selected from the group consisting of an electromagnetic actuator, a smart material actuator, a heating mechanism, a motorized mechanism, an electrostatic actuator, and a combination thereof.

8. The wearable article of claim 7, wherein the haptic actuator is an electromagnetic actuator or a motorized mechanism configured to provide a vibrational haptic feedback.

9. The wearable article of claim 7, wherein the haptic actuator is an electrostatic actuator configured to provide electrostatic haptic feedback.

10. A wearable article for providing haptic feedback, comprising:
a textile;
an adjustable interaction element associated with the structural material and composed of a deformable, electroactive material for encapsulating a liquid or a gas, and fluidly connected to a liquid or gas supply,
wherein the adjustable interaction element expands or contracts to provide a comfortable user fit; and
the deformable, electroactive material placed between an inner electrode and an outer electrode, the inner electrode located within the adjustable interaction element and positioned to physically contact the liquid or gas in the adjustable interaction element, and an insulator placed around the outer electrode to create a smart material actuator which can deform in response to an applied electric field between the two electrodes, wherein the applied electric field between the two electrodes results in haptic feedback provided by the adjustable interaction element.

11. The wearable article of claim 10, wherein the textile is in the form of a shirt, a pair of pants, a bodysuit, a hat, a glove or a shoe.

12. The wearable article of claim 10, wherein the adjustable interaction element comprises a dielectric polymer, a dielectric elastomer or a piezoelectric material.

13. The wearable article of claim 10, wherein the adjustable interaction element is fluidly connected to an air supply.

14. The wearable article of claim 10, further comprising a haptic actuator selected from the group consisting of an electromagnetic actuator, a smart material actuator, a heating mechanism, a motorized mechanism, an electrostatic actuator, or and a combination thereof.

15. The wearable article of claim 14, wherein the haptic actuator is an electromagnetic actuator or a motorized mechanism configured to provide a vibrational haptic feedback.

16. The wearable article of claim 14, wherein the haptic actuator is an electrostatic actuator configured to provide electrostatic haptic feedback.

17. The wearable article of claim 10, wherein the adjustable interaction element secures the wearable article against a user to allow the wearable article to move with the user, without sliding or moving out of position.

18. The wearable article of claim 1, wherein at least one of the two electrodes is patterned on the surface of the deformable material.

19. The wearable article of claim 10, wherein the inner and/or the outer electrode is patterned on the surface of the deformable material.

* * * * *

UNITED STATES PATENT AND TRADEMARK OFFICE
CERTIFICATE OF CORRECTION

PATENT NO. : 10,055,949 B2
APPLICATION NO. : 15/398856
DATED : August 21, 2018
INVENTOR(S) : Johnny Maalouf et al.

Page 1 of 1

It is certified that error appears in the above-identified patent and that said Letters Patent is hereby corrected as shown below:

In the Claims

Column 14, Line 10 (Claim 14): please delete the word "or".

Signed and Sealed this
Twenty-seventh Day of November, 2018

Andrei Iancu
*Director of the United States Patent and Trademark Office*